Jan. 10, 1933. J. DREYFUSS 1,893,986
ADJUSTABLE BRACE
Filed Jan. 31, 1930

Inventor:
Jacques Dreyfuss
By
Attorney

Patented Jan. 10, 1933

1,893,986

UNITED STATES PATENT OFFICE

JACQUES DREYFUSS, OF LAUSANNE, SWITZERLAND, ASSIGNOR TO THE FIRM ADRIA S. A. GALERIE DU COMMERCE, OF LAUSANNE, SWITZERLAND

ADJUSTABLE BRACE

Application filed January 31, 1930, Serial No. 424,990, and in Switzerland October 30, 1929.

The present invention relates to an adjustable brace. As a substitute for tightening braces by means of wedges devices have been known comprising a combination of many different mechanical parts. Such parts, however, required certain mechanical accessory implements which are not always at hand and did not render the device very economical. For this reason such devices have not been generally introduced.

The present invention has in view braces made of easily obtainable elements, and ready for use without further accessories. The brace according to the present invention is a tool requiring little care and no special instruction; it comprises two tubular telescoped elements combined with means supporting the inner tube across the outer tube by means of a nut provided on the threaded outside of this latter tube.

Figure 1:
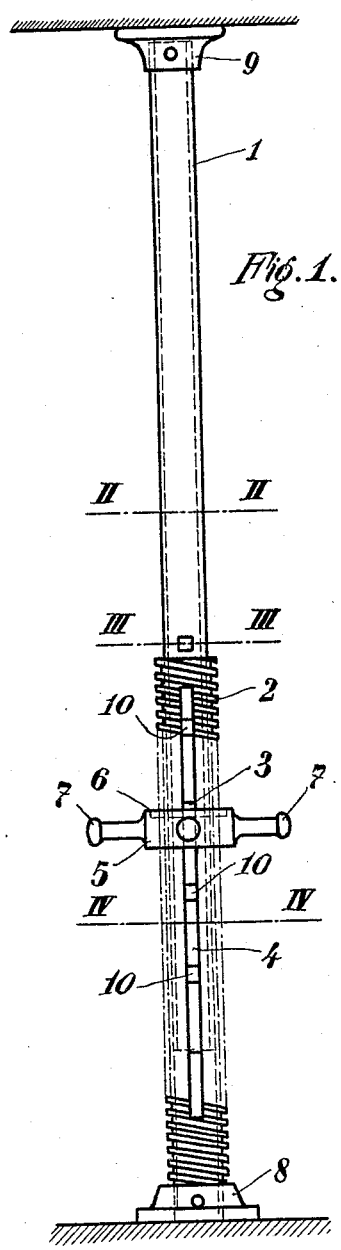
Figure 2:
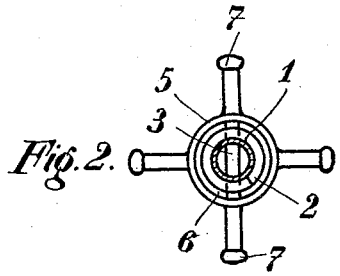
Figure 3:
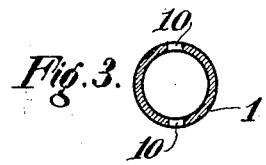
Figure 4:
Figure 5:
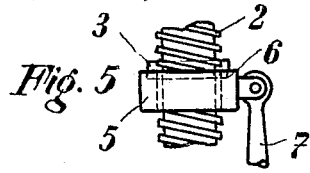

A working example of the subject of the present invention is represented in the accompanying drawing, where Fig. 1 is a side elevation. Figs. 2, 3 and 4 are cross-sections on lines II—II, III—III and IV—IV in Fig. 1. Fig. 5 is a particular form of the nut, and Fig. 6 shows a special way of holding fast the inside tube by means of the outside tube.

According to the drawing a tube 1 is inserted into a second tube 2 provided with outside threads. This second tube is made adjustable in height by means of a cross bar 3 which extends across the inner tube. The bar 3 also crosses the outer tube by means of slots 4 and is extended over the threads of this tube so that the ends of said bar are supported by a shoulder 6 provided inside of a nut 5 fitted to the outside thread of the tube 2. This shoulder 6 prevents the sliding of the bar in a longitudinal direction and its getting lost. In order to facilitate the handling of nut 5 it is provided with handles 7. In operating these handles the bar will remain resting on the nut and will slide up and down in the slots 4. To better utilize the length of the inner tube, this latter has a number of spaced holes 10 for receiving the bar 3 and serving as means for a rough adjusting of the inside tube 1, while the fine adjusting is made by working the nut 5. By so adjusting tube 1 the ends of the bar 3 will slide along the slots 4 and upon the shoulder 6. The tube 2 is provided with a base plate 8, and a head plate 9 is attached to the inner tube 1. These plates, however, are not necessary, and instead of the single thread on tube 2, a multiple thread can be arranged thereon so as to allow a quicker adjusting of said tube.

Instead of a number of solid handles 7, as shown in Fig. 2, the nut may also be moved by means of a hinged handle, as shown in Fig. 5.

Figure 6:
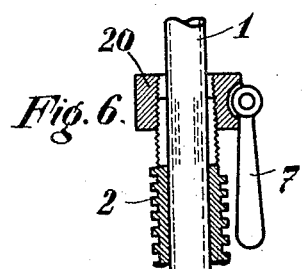

In special cases where on account of rapidly changing loads a breaking or collapsing of the inner tube 1 is to be feared and where after the tightening of the brace an increase of compression may take place, a nut 20, as shown in Fig. 6, fitted with a conical thread may be provided at the end of outer tube 2 in order to effect an intimate connection between the two tubes. By tightening this nut 20 the split ends of tube 2 will be pressed tightly against the surface of the inner tube 1.

What I claim as new is:

In an adjustable brace, the combination of a base plate, an externally threaded outer tube fixed to said base plate and provided with limited slots arranged opposite each other, a nut fitted to the threads of the outer tube and having a shouldered portion on its top face, handles attached to said nut as manoeuvering means of the same, an inner tube telescoped into the outer tube and provided with a number oif transverse holes registering with said slots, a transverse bar passing through one of the holes and having its ends extending into said shouldered portion on the top face of said nut, a conically threaded and slotted portion at the upper extremity of the outer tube and a second nut fitted to these conical threads and a handle hinged to said nut as means for clamping the extremity of the outer tube upon the inner tube.

In testimony whereof I affix my signature.

JACQUES DREYFUSS.